United States Patent

Hayama et al.

[11] Patent Number: 5,299,265
[45] Date of Patent: Mar. 29, 1994

[54] SYSTEM FOR SUPPLYING POWER TO A DETACHABLE GRILLE OF A CAR STEREO

[75] Inventors: Akira Hayama; Tsutomu Nishizaka, both of Saitama, Japan

[73] Assignee: Pioneer Electronic Corporation, Tokyo, Japan

[21] Appl. No.: 801,230

[22] Filed: Dec. 3, 1991

[30] Foreign Application Priority Data

May 31, 1991 [JP] Japan .................................. 3-174286

[51] Int. Cl.$^5$ ............................................ H04B 1/00
[52] U.S. Cl. .................... 381/86; 340/825.34; 455/346; 455/348
[58] Field of Search ................ 455/345, 346, 348; 340/825.31, 825.32, 825.34; 381/86

[56] References Cited

U.S. PATENT DOCUMENTS

| | | |
|---|---|---|
| 3,016,505 | 1/1962 | Collins . |
| 3,202,881 | 8/1965 | Carlyle . |
| 3,858,091 | 12/1974 | Wilkinson . |
| 4,162,517 | 7/1979 | Reed . |
| 4,716,496 | 12/1987 | Fritsch . |
| 4,720,700 | 1/1988 | Seibold et al. ............ 340/825.31 |
| 4,734,896 | 3/1988 | Soma et al. ............... 340/825.31 |
| 4,868,715 | 9/1989 | Putman et al. . |
| 4,945,335 | 7/1990 | Kimura et al. ............... 455/346 |
| 4,969,830 | 11/1990 | Daly et al. . |
| 5,020,748 | 6/1991 | Okajima . |
| 5,054,119 | 10/1991 | Rolland ....................... 455/346 |
| 5,097,392 | 3/1992 | Tanaka et al. . |
| 5,104,071 | 4/1992 | Kowalski . |

FOREIGN PATENT DOCUMENTS 3629656  3/1988  Fed. Rep. of Germany .
4008537  10/1990  Fed. Rep. of Germany .

*Primary Examiner*—Forester W. Isen
*Attorney, Agent, or Firm*—Nikaido, Marmelstein, Murray & Oram

[57] ABSTRACT

A body of a car stereo has a first substrate and a detachable grille has a second substrate. The second substrate has an operating device, a display and a control unit where an identification data is stored. The first substrate has a grille attachment detecting device a power supply means and a control unit having an identification data discriminating device which discriminates the identification data in the control unit on the second substrate of the grille. When the identification data discriminating device determines that an appropriate grille is attached, the power is fed to the grille through the power supply device.

2 Claims, 5 Drawing Sheets

SYSTEM FOR SUPPLYING POWER TO A DETACHABLE GRILLE OF A CAR STEREO

FIELD OF THE INVENTION

The present invention relates to a car stereo provided with a detachable grille, and more particularly to a system for supplying power to components of the grille.

BACKGROUND OF THE INVENTION

Increase in use of sophisticated car stereos in recent years has caused increase in the theft of the stereos. In order to prevent the theft of the stereo, there has been proposed measures for the stereos. In accordance with the one of the measures, a grille having a plurality of push button for a stereo is provided to be separated from the body of the stereo, and is detachably attached to the front portion of the stereo.

FIG. 4 shows the above described prior art. The car stereo 1 comprises a car stereo body 4 and a detachable grille 2 attached to the body 4. The body 4 has recessed panel 3 mounted at the front thereof. The panel 3 has a cassette opening 5 having a lid 6. A series of terminals 9 which are connected to terminals (not shown) provided at the back of the grille 2 when the grille is attached, are formed on the panel 3. The grille 2 has a cassette opening 7 which coincides with the cassette opening 5 of the body 4 and various operation keys 8.

In operation, a cassette tape is inserted into the car stereo body 4 through the cassette openings 7 and 5. A loading mechanisms provided in the body 4 is operated to carry the cassette to a playback position where the cassette is played.

In order to detach the grille 2 from the panel 3, the grille 2 is depressed at one side. A push-push mechanism (not shown) provided in the body 4 is operated to project the grille 2. The grille 2 is then pulled off the panel 3 of the body 4.

When the grille 2 is taken out, the stereo body loses the appearance as a car stereo. Hence, if the driver takes the grille 2 with him when leaving the vehicle, the theft of the car stereo is prevented.

When the grille 2 is attached on the panel 3 of the car stereo body 4, the terminals on the back of the grille 2 is connected to the terminals 9 of the body 4. A control unit provided in the car stereo body 4 detects that the grille 2 is attached when predetermined corresponding pairs of terminals of the grille 2 and the body 4 are connected with one another. The control unit is then operated to supply power to the terminals of the grille 2 from a battery provided in the body 4.

However, for convenience of manufacturing various stereos, it is required that the same parts may be used in common in various types of car stereo. As a result, the dimensions of grilles of various types are determined at the same value. Thus, a grille can be fit in a car stereo body which do not correspond to the grille. If a grille is erroneously attached to an unsuitable car stereo body, current inappropriately flows in electronic equipment in the car stereo body and the grille, which possibly damages them. In some case, since the terminals are arranged differently in each type of the grille, the car stereo may be erroneously operated because of erroneous connection of the terminals.

SUMMARY OF THE INVENTION

An object of the present invention is to provide a power supply system for preventing the power from being applied to terminals of the grille which does not correspond to the car stereo.

To this end, there is provided a system for supplying power from a battery to a detachable grille of a car stereo. The system has a first substrate provided in the car stereo and a second substrate provided in the grille. The second substrate has an operating device, a display and a control unit where an identification data is stored. The first substrate has a grille attachment detecting device, power supply device and a control unit having an identification data discriminating device which discriminates the identification data in the control unit on the second substrate of the grille. When the identification data discriminating device determines that an appropriate grille is attached, the power is fed to the grille through the power supply device.

In accordance with the system of the present invention, when the grille attachment detecting device detects that the grill is attached, the identification data in the control unit on the second substrate is fed to the identification data discriminating device to compare the data with identification data provided therein. If the data coincide with each other, the control unit of the first substrate operates the power supply device to supply power of the battery to the control unit of the grille substrate. If the data do not coincide, the power is cut off.

The other objects and features of this invention will become understood from the following description with reference to the accompanying drawings.

DETAILED DESCRIPTION OF THE PREFERRED EMBODIMENT

Figure 4:
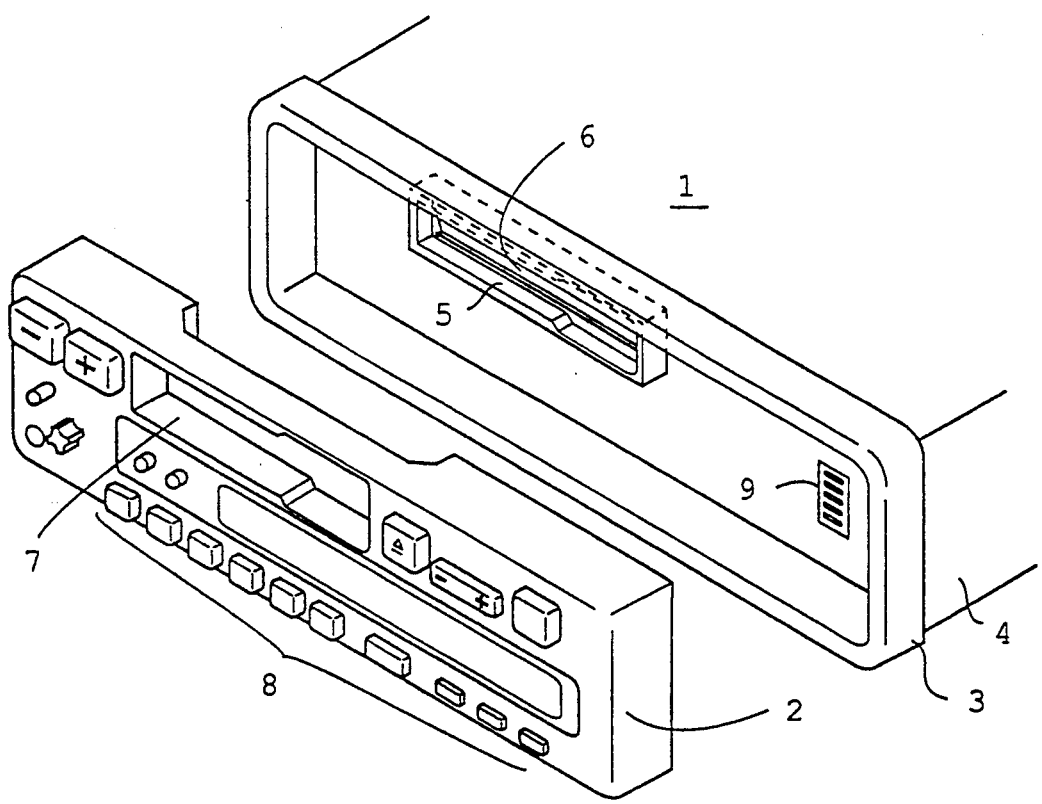
FIG. 4 is a perspective view of an example of a car stereo having a detachable grille.

A system for supplying power to the grille is applied to the conventional car stereo shown and described with reference to FIG. 4 so that further description of the construction of the car stereo is omitted.

Figure 1A:
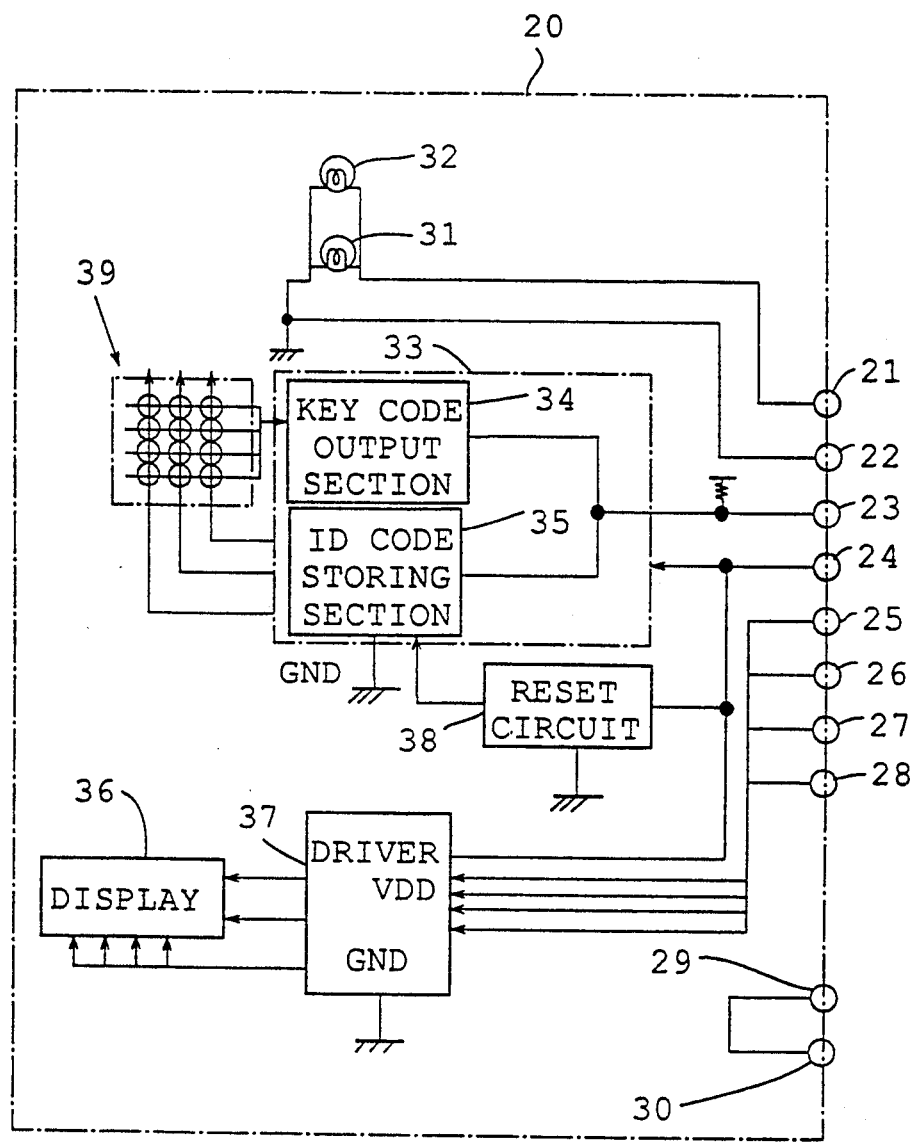
FIGS. 1a and 1b show block diagram of a system for supplying power to a grille attached to a car stereo body.
Figure 1B:
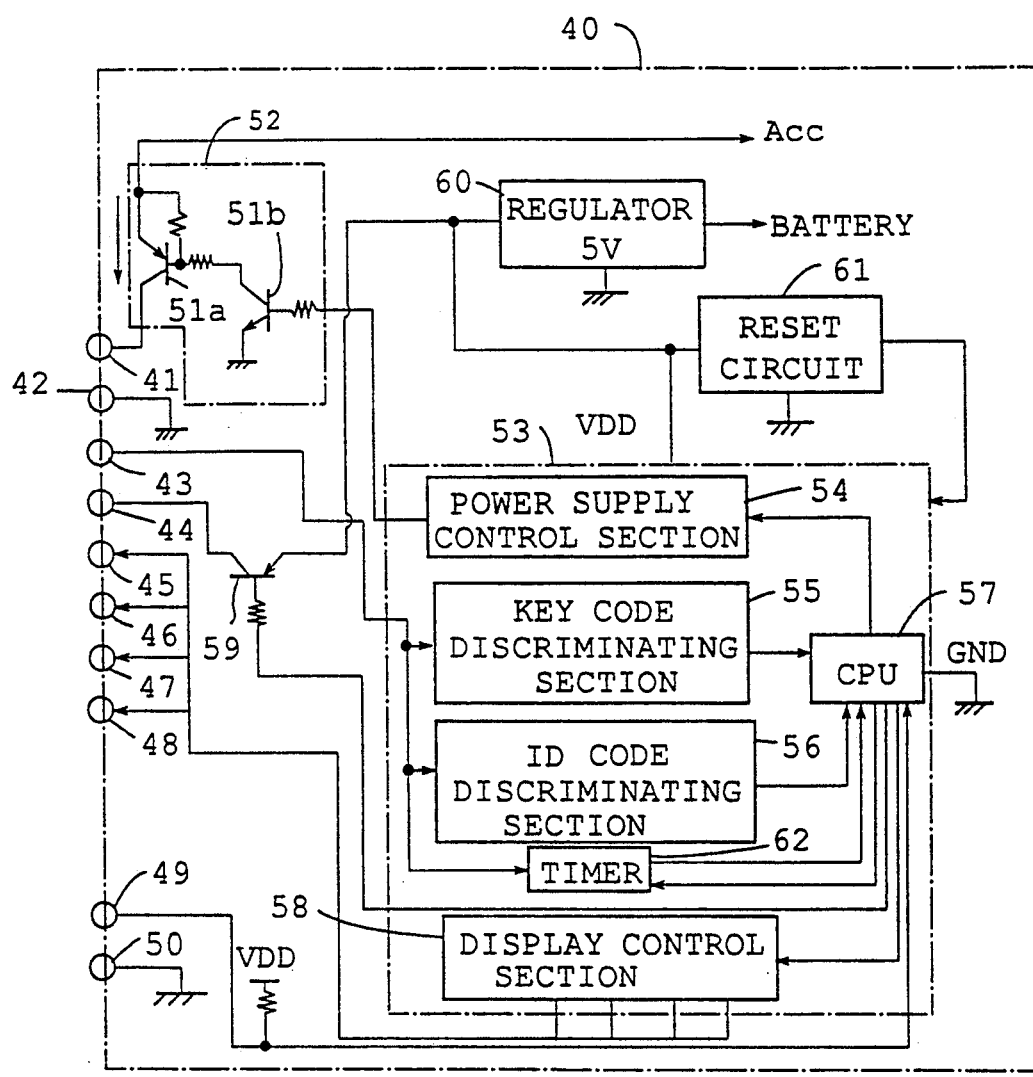

Referring to FIGS. 1a and 1b, the control system according to the present invention comprises a substrate 20 mounted on the grille 2 and a substrate 40 mounted on the car stereo body 4. Mounted on the substrate 20 are a control unit 33, operating section 39 comprising the operation keys 8, display 36 such as a liquid crystal display panel, driver 37 for driving the display 36, resetting circuit 38 for resetting the control unit 33, and a plurality of terminals 21 to 30 for connecting the substrate 20 to the substrate 40.

The control unit 33 has a key code output section 34 connected with the operating section 39 so as to transmit a key code in accordance with the operation of the keys 8, and an ID (identification) code storing section 35 storing a predetermined ID code of the particular car stereo 1 for discriminating the grille 2.

The terminals 21 and 22 are connected to a parallely connected pilot lamp 31 and a grille lighting lamp 32. The terminals 23 and 24 and the terminals 25 to 28 are connected to the control unit 33 and the driver 37, respectively. The terminals 29 and 30 are short-circuited to detect the attachment and the detachment of the grille 2.

The substrate 40 mounted in the car stereo body 4 has a plurality of terminals 41 to 50 corresponding to the terminals 21 and 30, control unit 53, voltage regulator 60 connected to a battery through a backup line for supplying a voltage of 5V to the control units 53 and 33, and a reset circuit 61 for resetting the control unit 53.

The control unit 53 has a key code discriminating section 55 for discriminating the key code transmitted from the key code output section 34 of the control unit 33, and an ID code discriminating section 56 for discriminating the ID code stored in the ID code storing section 35 of the control unit 33. The section 55 and 56 are connected to a CPU 57 which is operated to control a power supply control section 54, timer 62 and a display control section 58 in accordance with the key code and the ID code fed from the sections 55 and 56. The terminal 41 is connected to an accessory switch Acc of a motor vehicle through a power supply switching device 52 comprising transistors 51a and 51b. Namely, the terminal 41 is connected to a collector of the transistor 51a, the base of which is connected to a collector of the transistor 51b. The base of the transistor 51b is connected to the power supply control section 54 of the control unit 53 so that when the power supply control section 54 is operated to render the transistor 51b conductive, the transistor 51a also becomes conductive, thereby supplying power of a battery to the grille through the accessory switch.

The terminal 44 is connected to the regulator 60 through a transistor 59, the base of which is connected to the CPU 57 of the control unit 53. The terminal 44 to 48 are connected to the display control section 58. The terminal 49 is applied with voltage $V_{DD}$ which is also applied to the CPU 57. When terminal 29 of the grille 2 is connected to the terminal 49, thereby connecting the terminals 49 and 50, the voltage $V_{DD}$ decreases. The CPU 57 thus determines that the grille 2 is attached to the body 4.

Figure 2:
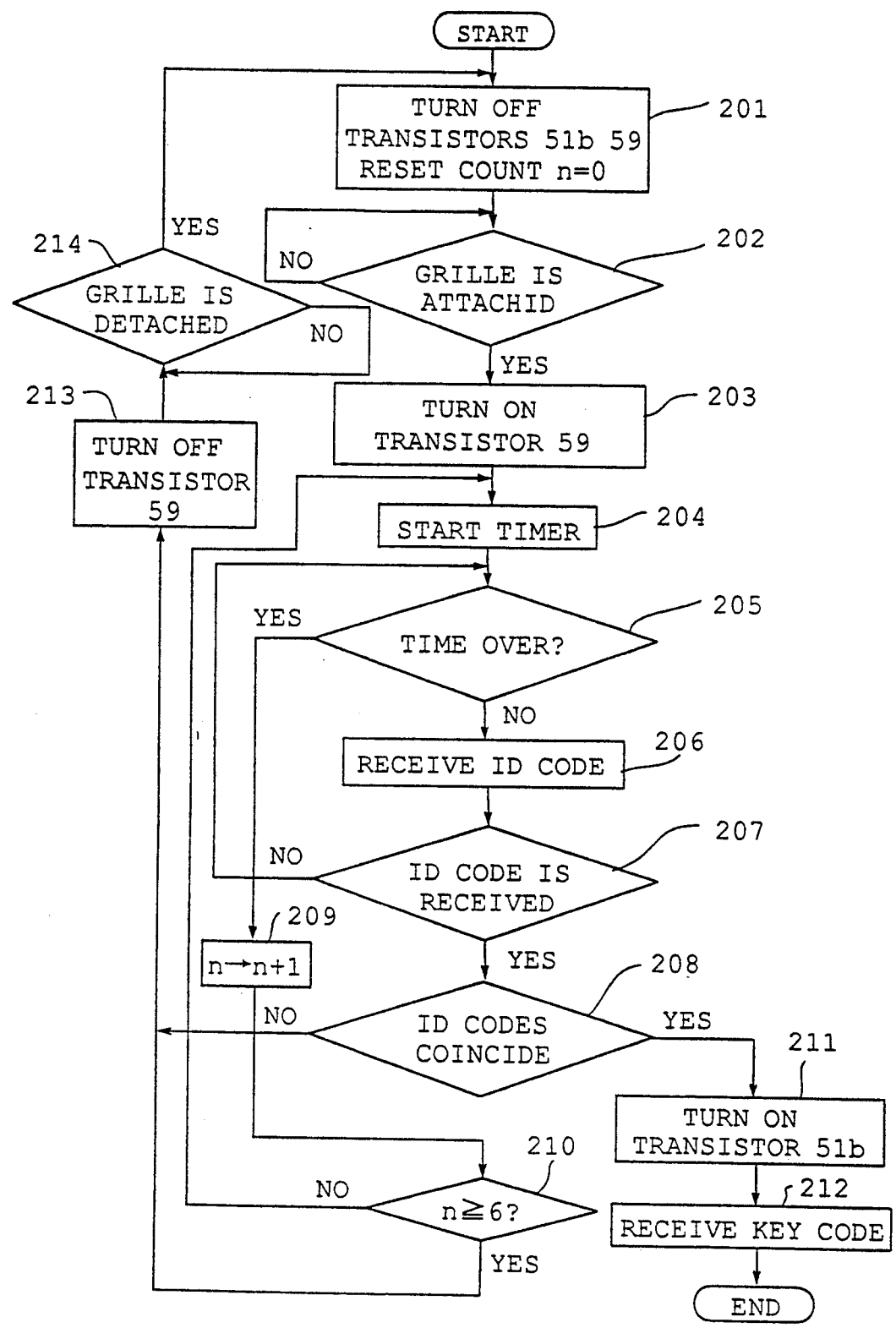
FIG. 2 is a flowchart describing the operation of the system.
Figure 3:
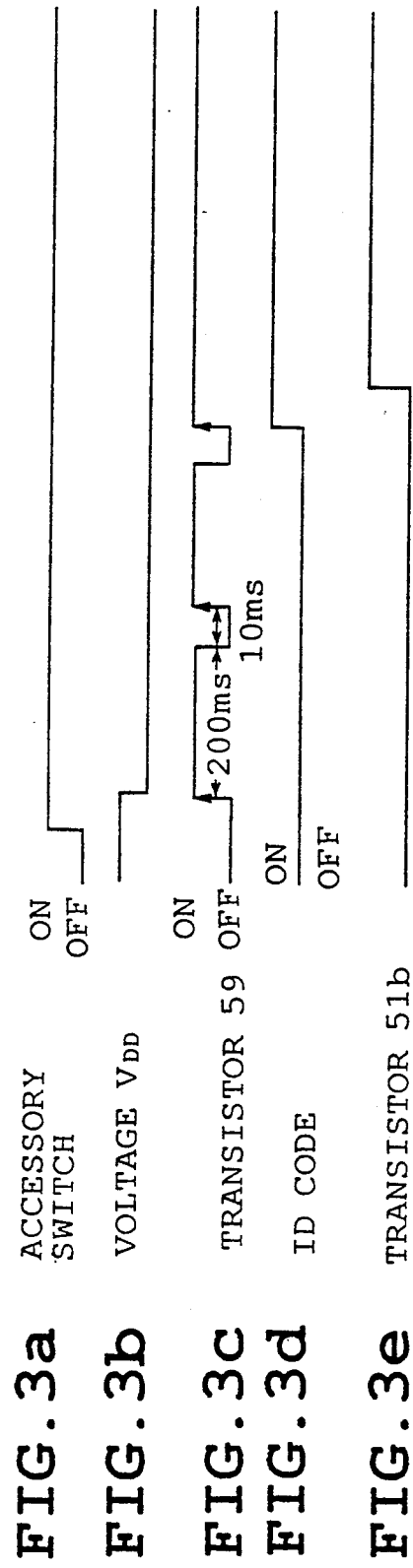
FIGS. 3(a)-(e) are a timecharts describing the timing in operation of the system.

The operation of the control system is described hereinafter with reference to FIGS. 2 and 3. Initially, although the ignition switch of the motor vehicle is turned off, the control unit 53 of the car body substrate 40 is supplied with a voltage of 5V through the backup line and the regulator 60. The transistor 51b and hence the transistor 51a, and the transistor 59 are all inconductive. In the grille substrate 20, a reset count n of the reset circuit 39 is cleared.

Although the accessory switch is turned on as shown in FIG. 3a at a step 201, the transistor 51b is It is determined at a step 202 that the grille 2 is attached to the body 4 when the terminals 29 and 30 of the grille 2 is connected to the terminals 49 and 50 of the car stereo body 4, respectively, so that the voltage $V_{DD}$ decreases as shown in FIG. 3b. The CPU 57 applies a signal to the base of the transistor 59, thereby rendering the transistor 59 conductive as shown in FIG. 3c. Thus, the voltage of 5V regulated at the regulator 60 is supplied to the control unit 33 of the grille substrate 20 through the terminals 44 and 24 at a step 203. At a step 204, the timer 62 of the control unit 53 is started to count 200 msec, during which the transistor 59 is kept conductive.

When it is determined at a step 205 that 200 msec has not yet lapsed, the ID code stored in the ID code storing section 35 of the control unit 33 is fed to the ID code discriminating section 56 of the control unit 53 through the terminals 23 and 43 at a step 206. When it is confirmed that the ID code discriminating section 56 has received the ID code at a step 207, the discriminating section 56 compares the transmitted ID code with the ID code stored therein at a step 208. When the ID codes match with each other, the CPU 57 of the control unit 53 applies a control signal to the power supply control section 54 to render the transistor 51b of the power supply switching device 52 conductive at a step 211. The transistor 51a accordingly becomes conductive, thereby supplying the power to the grille 2 through the terminals 41 and 21 to light the pilot lamp 31 and the grille lighting lamp 32 of the grille 2. Thus the control unit 53 is ready to receive various key codes from the key code output section 34 of the control unit 33 in accordance with the operation of the operating section 39 (step 212).

When it is determined at the step 208 that the IC code from the control unit 33 does not coincide with the IC code stored in the control unit 53, the transistor 59 is rendered inconductive, so that the supply of power to the control unit 33 is stopped at a step 213. When the grille 2 is detached from the car stereo body 4 (step 214), the program returns to the step 201. When the step 205 determines that 200 msec elapsed, the reset count n of the reset circuit 38 is count up $(n \leftarrow n+1)$ at a step 209. Thereafter, the CPU operates to render the transistor 59 inconductive for 10 msec as shown in FIG. 3c. A transistor operating cycle wherein the transistor 59 is conductive for 200 msec and then inconductive for 10 msec is repeated for 6 times. The count n is count up at each cycle. When it is determined at a stereo 210 that the reset count n is 6, the program proceeds to the step 213 to render the transistor 59 inconductive. The supply of power to the control unit 33 is thus kept cut off.

More particularly, in the embodiment of the present invention, if the ID code is not transmitted from the control unit 33 of the grille 2 to the control unit 53 of the car stereo body 4 within 200 msec after the start of the power supply to the grille, the power is intermittently cut off. When the ID code discriminating section 54 receives the ID code during one of the transistor operating cycles, for example, in the third cycle as shown in FIG. 3d, the program proceeds to the step 208 where the ID code is discriminated.

Thus, in accordance with the present invention, overcurrent is prevented from flowing in electronic equipments of a grille which is erroneously attached to the car stereo body. Although an inappropriate grille having terminals arranged differently from those of the car stereo body may be attached to the particular car stereo body, the supply of power from the battery is cut off, so that terminal of the car stereo body is prevented from short-circuiting. Thus, the electronic equipments of the grille and the car stereo body are safe from damage and prevented of erroneous operation.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for supplying power to a detachable grille of a car stereo, said car stereo having a stereo body and a first control unit, said system comprising:

the grille having a second control unit including an identification code thereof;

detector means for detecting attaching of the grille to the car stereo body of the car stereo and for producing an attaching signal;

first supplying means provided in the first control unit and responsive to the attaching signal, said first supplying means for supplying a first power from the car stereo body to the second control unit of the grille and for causing the second control unit to send the identification code to the first control unit;

discriminating means provided in the first control unit and for comparing the identification code of the grille with a reference identification code and for producing a coincide signal when both codes coincide with each other; and second supplying means responsive to the coincide signal for supplying a second power from the car stereo body to the grille for effecting operation of the grille.

2. A system according to claim 1 wherein the detector means comprises a circuit formed by the attaching of the grille and arranged to reduce the voltage in the circuit.

* * * * *